United States Patent [19]

Dotson

[11] Patent Number: 4,747,155
[45] Date of Patent: May 24, 1988

[54] MOTION COMPENSATION FOR ELECTRO-OPTICAL CAMERA IMAGERY

[75] Inventor: Charles R. Dotson, Litchfield Park, Ariz.

[73] Assignee: Loral Corporation, New York, N.Y.

[21] Appl. No.: 902,854

[22] Filed: Sep. 2, 1986

[51] Int. Cl.$^4$ .............................................. G06K 9/00
[52] U.S. Cl. ...................................... 382/42; 382/34; 358/105; 358/109
[58] Field of Search ....................... 382/54, 42, 46, 45, 382/34; 358/222, 109, 105

[56] References Cited

U.S. PATENT DOCUMENTS

| | | | |
|---|---|---|---|
| 3,617,016 | 11/1971 | Bolsey | 358/105 |
| 3,952,299 | 4/1976 | Hodge | 382/42 |
| 4,040,087 | 8/1977 | Hall | 358/222 |
| 4,064,533 | 12/1977 | Lampe | 358/105 |
| 4,136,332 | 1/1979 | Kadota | 382/45 |
| 4,231,062 | 10/1980 | Stewich | 358/109 |
| 4,307,420 | 12/1981 | Ninomiya | 358/105 |
| 4,435,835 | 3/1984 | Sakow | 382/34 |
| 4,503,557 | 3/1985 | Maeda | 382/34 |
| 4,639,773 | 1/1987 | Hurst | 358/105 |
| 4,654,876 | 3/1987 | Atkins | 382/54 |

*Primary Examiner*—Leo H. Boudreau
*Assistant Examiner*—A. Anne Skinner
*Attorney, Agent, or Firm*—P. E. Milliken; R. L. Weber

[57] ABSTRACT

An apparatus (32) and technique for compensating for motion in an electro-optical camera system. An image system is maintained on an aircraft for generating an image of terrain while the aircraft is in flight. A high resolution linear array (24) generates an image from a field of view (30), while a rectangular array (26) generates a corresponding image on a periodic basis. The rectangular image serves as a reference for the pixels of the linear array for determining if features in the linear array have shifted or distorted. An error is generated corresponding to the differences between the linear array and the rectangular array, the linear array being corrected as a function of the error.

14 Claims, 2 Drawing Sheets

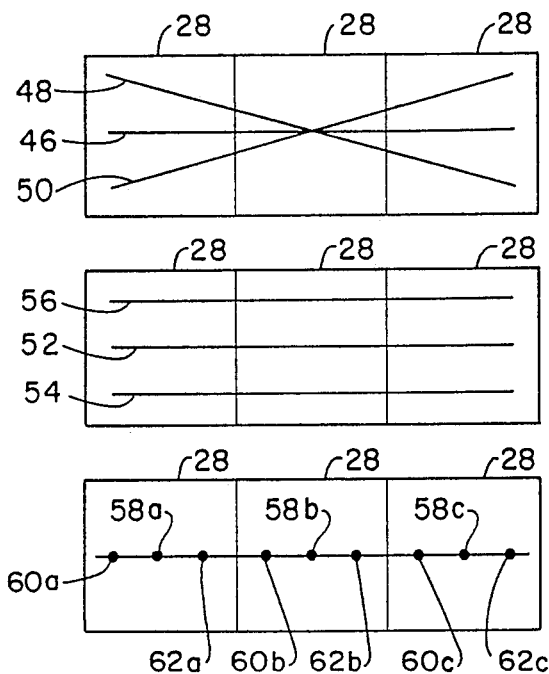
FIG.-4
FIG.-5
FIG.-6
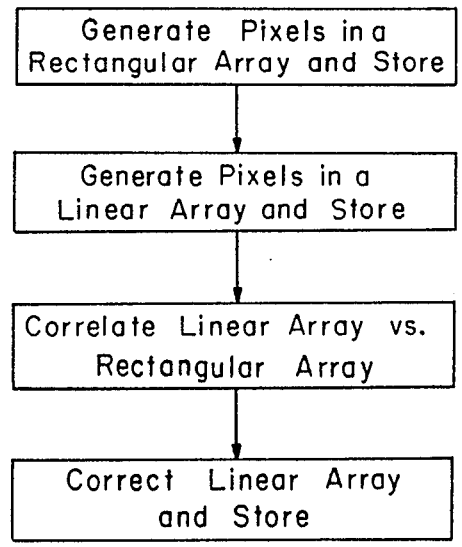
FIG.-7

MOTION COMPENSATION FOR ELECTRO-OPTICAL CAMERA IMAGERY

TECHNICAL FIELD

The invention herein resides in the art of optical image systems and, more particularly, to such systems which are airborne or otherwise operative in motion.

BACKGROUND ART

Heretofore it has been well known to utilize optical systems on aircraft for purposes of taking continuous aerial photographic images of terrain. Typically, a camera is fixedly maintained on board the aircraft, receiving and storing images of the terrain below as the aircraft passes thereover. Such stored images are then used for purposes of locating and identifying various features in the terrain for subsquent purposes.

In FIG. 1 there is shown an electro-optical image system designated generally by the numeral 10 of the type which would typically be carried on an aircraft. In such a system, a lens 12 is maintained in fixed relationship to an image receiving device such as a linear array of charge coupled devices 14. Obviously, the linear array 14 is maintained at the focal length of the lens 12 to appropriately receive the desired images. It has previously been known in the art that the linear array 14 would consist of a single line of charge coupled devices, for example 10,000 or more, each receiving a discrete portion of the total image viewed, and converting that image into a charge or voltage characteristic of the light received by the charge coupled device from the object being viewed. Such a charge can then be correlated to a gray scale for generating an electronic image, or may be digitized for generation of a digital image. In any event, it should be understood that the linear array 14 views a field of view 16 through the lens 12 and generates a linear array of picture elements or pixels corresponding to the view. With a linear array, the field of view 16 is correspondingly linear such that as the aircraft travels and progressive images are continuously generated, a total view of the terrain is generated as a rectangular field of view.

Of particular concern in the prior art is distortion in the image received by the linear array 14 as a result of aircraft movement while the image is being generated. If the aircraft departs from a fixed forward velocity while the linear array 14 is being scanned, the digital image will be distorted as a function of such movement. Typically, pitch, roll, or yaw of the aircraft will tend to distort the final image. Accordingly, there is a need for correcting or compensating for the distortion resulting from such movement. Indeed, the fidelity of the final image is a function of the uncompensated aircraft motion.

Previously, it has been known to use inertial platforms on which the camera 12,14 may be mounted. Such inertial platforms measure the movement of the aircraft and provide compensation for the same. However, these electro-mechanical devices are extremely expensive to purchase and maintain and are delicate in operation.

There is in the art a need for a totally electronic device for achieving compensation for aircraft movement when images are generated with a linear array as stated above. Further, such a device is desired to be both simplistic and reliable in operation while being inexpensive to implement. Prior to the concept of the instant invention, the art has been devoid of such a structure or technique.

DISCLOSURE OF INVENTION

In light of the foregoing, it is a first aspect of the invention to provide motion compensation for electro-optical camera imagery which is totally electronic in nature.

Another aspect of the invention is the provision of motion compensation for electro-optical camera imagery which is reliable and durable in operation.

Still another aspect of the invention is the provision of motion compensation for electro-optical camera imagery which is simplistic in construction and operation.

Yet a further aspect of the invention is the provision of motion compensation for electro-optical camera imagery which is easily implemented using state-of-the-art apparatus and techniques.

The foregoing and other aspects of the invention which will become apparent as the detailed description proceeds are achieved by a process for correcting image distortion in an image array, comprising: generating a first array of an image of interest; generating a second array of an image maintained within said image of interest; correlating the image of said first array with the image of said second array; detecting an error between said images of said first and second arrays; and adjusting said images of said second array to correct for said error.

Other aspects of the invention are achieved by a system for determining and correcting image distortion in an image array, comprising: first means for generating a first image; second means for generating a second image, said second image comprising a portion of said first image; correlation means interconnected between said first and second means for receiving said first and second images and comparing said second image with said portion of said first image and establishing an error signal therefrom; and means connected to said correlation means, receiving said error signal, and modifying said first image as a function thereof.

DESCRIPTION OF THE DRAWINGS

For a complete understanding of the objects, techniques, and structure of the invention reference should be made to the following detailed description and accompanying drawings wherein:

FIG. 4 is an illustration of the comparison between the actual image and the image resulting from the plane yawing;

FIG. 5 is an illustration of the comparison between the actual image of interest and the image resulting from the plane pitching during image generation;

FIG. 6 is an illustration of a comparison of the actual image and the image resulting from the plane rolling during image generation; and FIG. 7 is a flow chart demonstrating the technique of image compensation according to the invention.

BEST MODE FOR CARRYING OUT THE INVENTION

Figure 1:
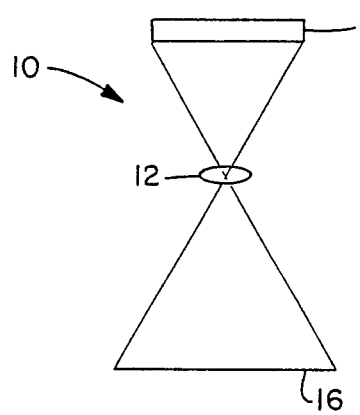
FIG. 1 is a schematic illustration of a prior art optical image system.
Figure 2:
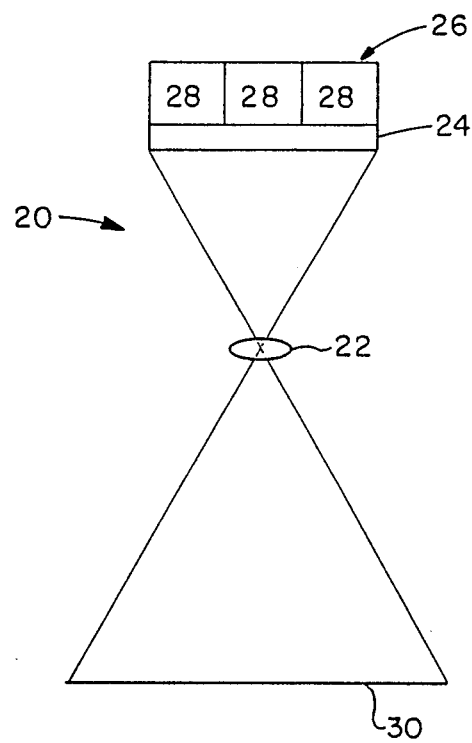
FIG. 2 is a schematic diagram of an optical image system according to the instant invention.

Referring again to the drawings, and more particularly FIG. 2, it can be seen that an electro-optical image system according to the invention is designated generally by the numeral 20. Here, a lens 22 is fixedly maintained upon the aircraft while a linear charge coupled device array 24 is maintained in the focal plane of the lens 22. As stated above, the linear array 24 would typically be capable of sequentially processing some 10,000 picture elements or pixels of the image viewed through the lens 22. Also maintained in fixed relation to the lens 22 is a rectangular charge coupled device array 26, the elements of which are also adapted for receiving an image through the lens 22. The rectangular array 26 is comprised of a plurality of square arrays 28, preferably three, each of which comprises a small number of charge coupled devices. In a preferred embodiment of the invention, each of the square arrays 28 would be a 16×16 array of charge coupled devices, accordingly containing 256 such devices. The rectangular array 26 would thus contain 768 such charge coupled devices at the focal plane of the lens 22. It will be understood that the linear array 24 has a number of charge coupled devices which is an order of magnitude greater than that of the rectangular array 26. Finally, the field of view 30, comprising terrain or the like, viewed by the arrays 24,26 through the lens 22 will differ slightly. The field of view 30 sensed and monitored by the linear array 24 will be a linear field of view, while that viewed by the rectangular array 26 will be a rectangular array. Obviously, since the number of charge coupled devices of the linear array 24 is an order of magnitude greater than that of the rectangular array 26, the resolution achieved from the array 24 will be much greater. As will be discussed hereinafter, the rectangular array 26 serves only as a reference array for correcting distortion as monitored by the linear array. Sharing the same lens 22 and in the same focal plane, the image received by the linear array 24 will be maintained within the rectangular array 26.

Figure 3:
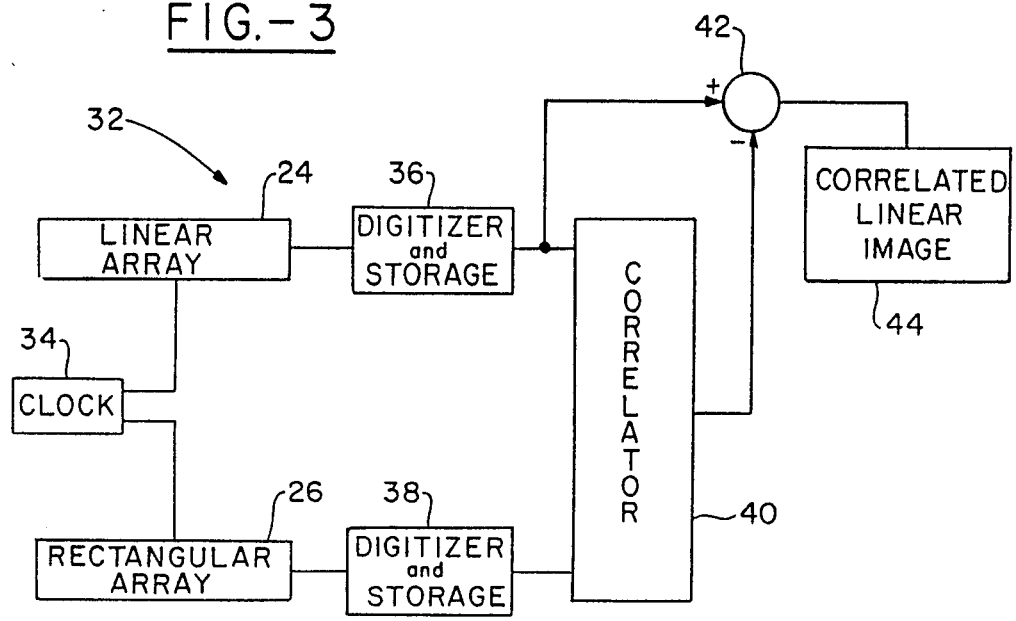
FIG. 3 is a circuit block diagram of the image generating and compensation circuitry of the invention.

With reference now to FIG. 3, it can be seen that the system of the invention is designated generally by the numeral 32. In the system, a clock 34 is provided for timing actuation of the arrays 24,26. In operation, the linear array 24 will be clocked continuously such that the charge coupled devices thereof will be sequentially accessed for obtaining the charge thereon corresponding to the associated pixel view. An extremely high clock rate is provided for this purpose. A fraction of the clock rate applied to the array 24 is used for activating the rectangular array 26. It will be understood that the rectangular array 26 is only taken periodically to serve as a reference for the linear array 24. In a preferred embodiment of the invention, the rectangular array 26 will be activated once per second and, because of the small number of charge coupled devices maintained therein, the period of time necessary for taking a frame image with the rectangular array is extremely small, such as an order of magnitude less than the time required for the linear array 24. Indeed, provisions may be made for simultaneously activating the various charge coupled devices of the rectangular array 26, although such speed is not necessary. Since the total number of pixels taken by the rectangular array 26 is so small, and the processing time is so fast, any movements such as yaw, pitch, or roll of the aircraft during activation of the rectangular array 26 will result in no perceivable distortion. Accordingly, the output of the array 26 may serve as a reference for the corresponding images of the linear array 24 contained therein.

The output of the linear array 24 is passed to the circuit 36 in which the pixels are digitized and stored. In like fashion, the output of the rectangular array 26 is passed to the circuit 38 for digitizing and storing. Of course, the digitizing and storing techniques may be made as part and parcel of the linear and rectangular arrays. Accordingly, there are presented and stored digitized pixels of the images viewed by both arrays.

In a preferred embodiment of the invention, the generation of the images is completed while the aircraft is in the air and compensation for distortion is achieved thereafter. However, it is contemplated that such compensation and correction may be achieved as the images are generated. In either event, the circuitry and technique are the same. The stored digitized images from the circuits 36,38 are presented to a correlator 40 in which the digitized image of the rectangular array 26 serves as a reference. The corresponding digitized images from the linear array 24 are compared to the images of the reference and if any shift or rotation of those images are sensed by the correlator 40, an error signal is presented to the summing circuit 42. Also presented to the summing circuit 42 is the digitized image of the linear array 24. The error signal corrects, on a pixel-by-pixel basis, the image of the linear array with the corrected image then being stored in the storage element 44.

An appreciation of the various distortions or errors which might be attained may be achieved from an understanding of FIGS. 4-6. In FIG. 4, the line 46 designates the actual line of interest, 16 pixels long, attained from the rectangular array. The line 48 indicates the image of the line 46 attained from the linear array 24 which results from the plane yawing clockwise during the generation of the linear array image. The error would be detected by the correlator 40 indicating a necessity of rotating the image of the line 48 the number of degrees necessary to cause the features of the line 48 to coincide with the features of the line 46. Similarly, the line 50 designates the image from the linear array 24 resulting from the plane yawing counterclockwise. The correlator 40, sensing such error, would produce an error signal requiring that the pixels of the line 50 be rotated clockwise a number of degrees separating the lines 50,56.

In FIG. 5, the line 52 designates the actual line of the features of interest, 16 pixels long, as obtained from the rectangular array 26. The line 54 presents the image of the same line 52 from the linear array 24 as would result from the plane pitching to the fore (nose down). Sensing the separation between the lines 52,56, the correlator 40 would compensate by shifting the pixels of the linear array image up the distance separating the lines 52,54. In like manner, the line 56 represents the image of the line 52 as taken by the linear array 24 with the plane pitching aft (nose up). The correlator 40, sensing such error, would generate an error signal sufficient to shift the line 56 down to be congruent with the line 52.

Finally, FIG. 6 demonstrates the results of image distortion from the plane rolling. Points 58a, 58b, 58c, represent three points of interest in the reference image taken from the rectangular array and in their actual position. Points 60a, 60b, 60c show these same three points as developed from the image of the linear array 24, shifted to the left, and resulting from the plane rolling to the right. The correlator 40, sensing such shift would generate an error signal to compensate the image of the linear array 24 by shifting the pixels of the linear array to the right a sufficient distance to cause the points 58 to coincide with the points 60. In like manner, the three points 62a, 62b, 62c represent the three points in interest as generated by the linear array 24 resulting from the plane rolling to the left. The correlator 40 would, in such an instance, generate an error signal to shift the points 62 to the left a sufficient distance to be coincident with the points 58.

Obviously, the illustrations set forth in FIGS. 4–6 are for illustrative purposes only. Typically, a plane may experience any combination or permutation of the various motions of pitch, yaw, or roll. Accordingly, the error signal may have to both shift and rotate the pixels of the linear image to be congruent with those of the reference rectangular image.

FIG. 7 sets forth the basic operation just described. First, rectangular array pixels are generated and stored. The linear array pixels are similarly generated and stored, the image of the linear array being maintained within the image of the rectangular array. The completed arrays are then correlated against each other and an error signal determined. Finally, the linear array image is corrected by the error signal and the compensated image is stored. Obviously, each frame of the linear array 24 must be compensated to attain a high resolution image with minimized distortion.

Thus it can be seen that the objects of the invention have been satisfied by the structure presented hereinabove. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be had to the following claims.

What is claimed is:

1. A process for correcting image distortion in an image array, comprising:
    generating a first rectangular array of an image of interest;
    generating a second linear array of an image maintained within said image of interest;
    correlating the image of said first array with the image of said second array;
    determining an error between said images of said first and second arrays;
    adjusting said image of said second array to correct for said error; projecting said first and second images onto said rectangular and linear arrays by a focusing means, said arrays sharing a common focal plane for respectively receiving said image; and
    generating said rectangular and linear arrays by storing charges on a plurality of charge coupled devices;

2. The process according to claim 1 wherein said rectangular array is generated by generating a plurality of square arrays.

3. The process according to claim 2 wherein said plurality of square arrays are generated simultaneously.

4. The process according to claim 1 wherein the time required for generation of said first array is an order of magnitude less than the time required for generation of said second array.

5. The process according to claim 1 which further includes the steps of transferring said stored charges of said charge coupled devices to storage means.

6. The process according to claim 5 wherein said charge on each said charge coupled device constitutes a pixel of an associated image, said pixels being stored in said storage means.

7. The process according to claim 6 wherein said images of said linear array and said rectangular array are correlated by comparing portions of features in said linear array to portions of corresponding features in said rectangular array, said rectangular array serving as a reference.

8. The process according to claim 7 wherein said error is determined from differences in positional relationships of said corresponding features in said rectangular and linear arrays.

9. The process according to claim 8 wherein said image of said linear array is adjusted according to said error by shifting said pixels of said linear array to attain an alignment as established by said rectangular array.

10. A system for determining and correlating image distortion in an image array, comprising:
    first means for generating a first image;
    second means for generating a second image, said second image comprising a portion of said first image;
    correlation means interconnected between said first and second means for receiving said first and second images and comparing said second image with said portion of said first image and establishing an error signal therefrom;
    means connected to said correlation means, receiving said error signal, and modifying said first image as a function thereof;
    wherein said first means comprises a rectangular array of charge coupled devices, each such device receiving and storing a charge corresponding to a portion of said first image;
    wherein said second means comprises a linear array of charged coupled devices, each such device receiving and storing a charge corresponding to a portion of said second image; and focusing means for respectively projecting said first and second images onto said rectangular and linear arrays, said arrays sharing a common focal plane for receiving said images.

11. The system according to claim 10 wherein said first and second means further comprise means for digitizing said charges of said charge coupled devices as pixels of said respective image portions.

12. The system according to claim 11 wherein said first and second means further comprise storage means connected to said means for digitizing for receiving and storing said pixels.

13. The system according to claim 12 wherein said correlation means compares pixels generated by said linear array with corresponding pixels of said rectangular array, said rectangular array serving as a reference for positional alignment of said pixels of said linear array, and generates an error signal as a function of positional misalignment between said pixels of said linear array and said corresponding reference pixels of said rectangular array.

14. The system according to claim 13 wherein said means for modifying said first image shifts pixels of said linear array according to said error signal to align said pixels of said linear array with said corresponding pixels of said rectangular array.

* * * * *